June 29, 1965 G. R. FUNK 3,191,545
ASEPTIC JOINT SEAL
Filed Jan. 22, 1962 2 Sheets-Sheet 1
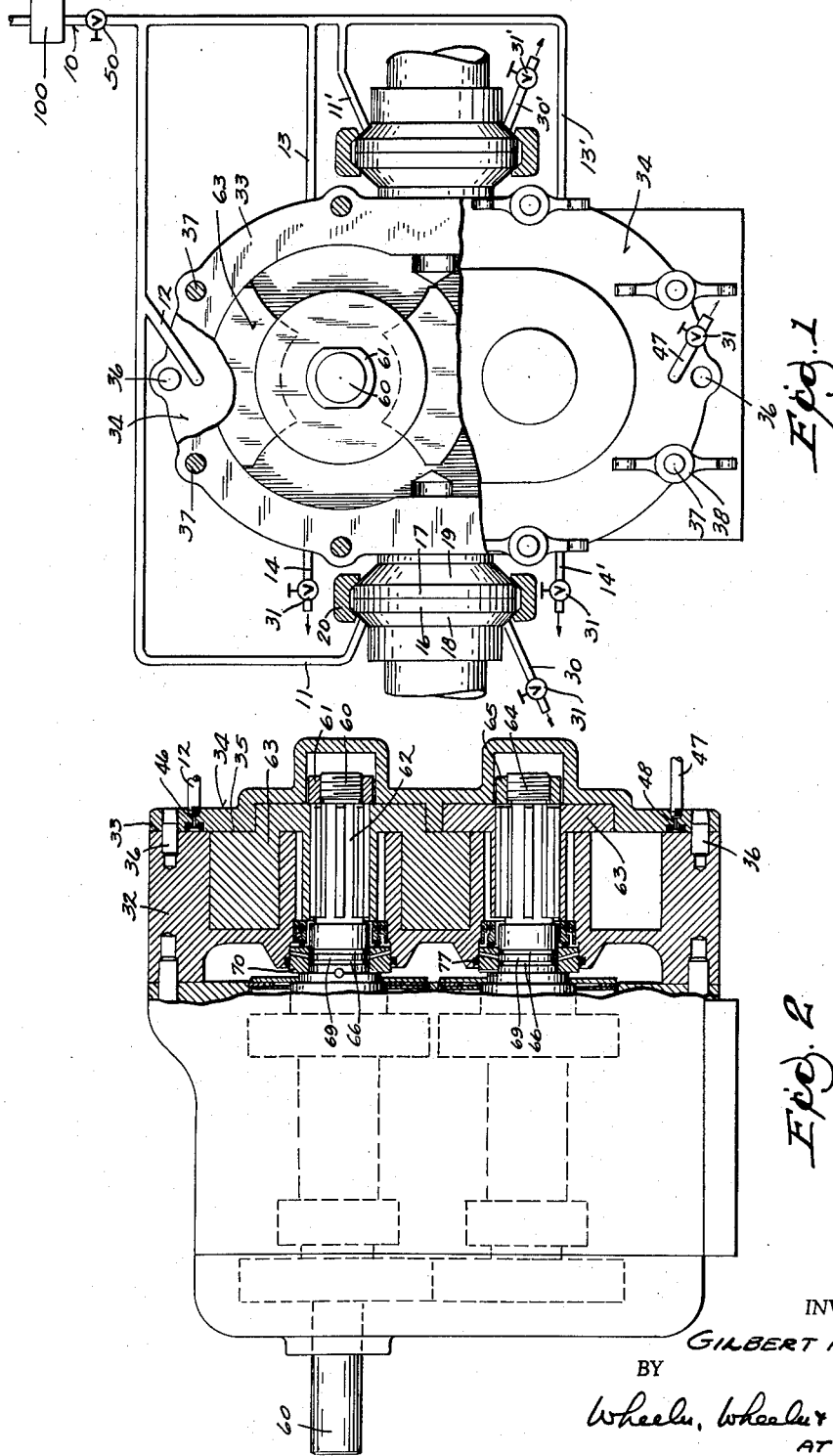
INVENTOR.
GILBERT R. FUNK
BY
Wheeler, Wheeler & Wheeler
ATTORNEYS June 29, 1965   G. R. FUNK   3,191,545
ASEPTIC JOINT SEAL
Filed Jan. 22, 1962   2 Sheets-Sheet 2
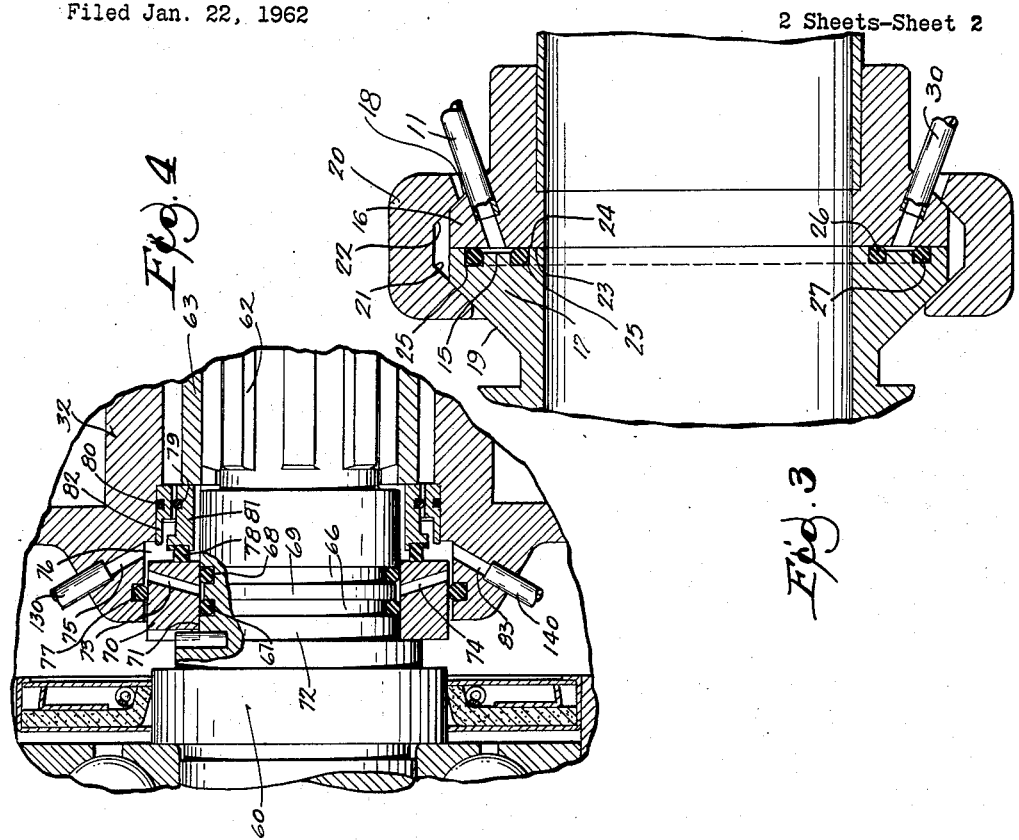
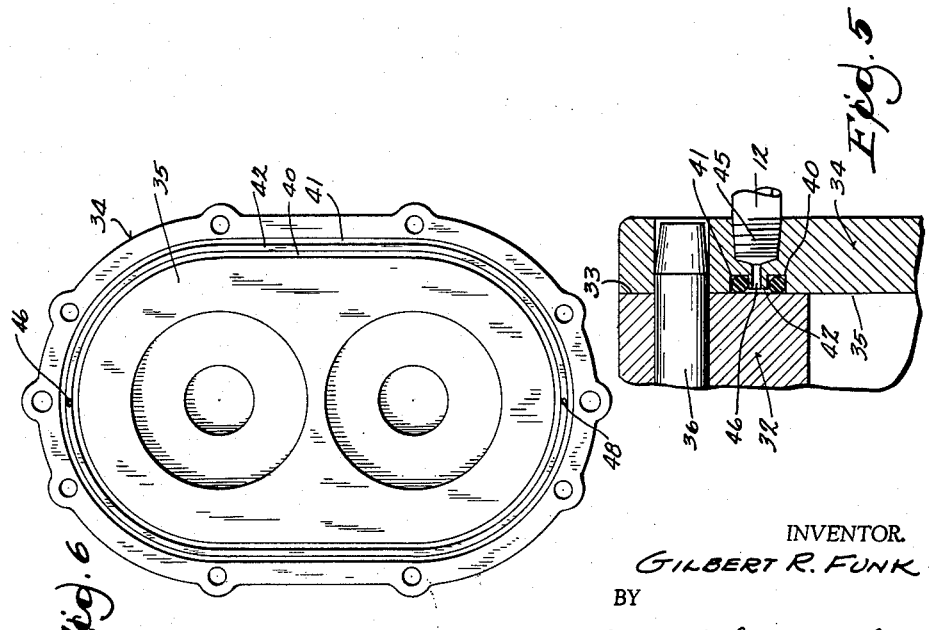
INVENTOR.
GILBERT R. FUNK
BY
Wheeler, Wheeler & Wheeler
ATTORNEYS United States Patent Office 3,191,545
Patented June 29, 1965

3,191,545
ASEPTIC JOINT SEAL
Gilbert R. Funk, Waukesha, Wis., assignor to Waukesha Foundry Company, Waukesha, Wis., a corporation of Wisconsin
Filed Jan. 22, 1962, Ser. No. 167,619
15 Claims. (Cl. 103—202)

This invention relates to an aseptic joint seal.

The invention consists of a means of sealing a joint to prevent contamination of a substance on one side of the joint by entrance of outside contaminants and further to prevent escape of the substance through the joint. In its broad form it consists of a pair of seals extending in generally concentric closed loops about the area to be sealed, between which a medium under pressure is circulated. The invention may further comprise using as the pressure medium an antiseptic solution, or steam which is sufficiently heated to sterilize the areas which it contacts. In this manner the benefits of positive sterilization are added to the prevention of leakage either way through the joint by maintaining a positive pressure inside the joint.

The seal is described herein as applied to a pump for foods, but the invention could be applied to devices other than pumps and other than pumps for use in the food processing industry. It is particularly useful in food handling devices wherein the parts must be maintained absolutely free of contamination and leakage in order to assure a sanitary product.

In the drawings:

FIG. 1 comprises an end view of the pump of my invention with portions broken away to show the pump rotor and the cross-sectional shape of the rings which secure the input and output pipes to the pump.

FIG. 2 is a side view of the pump of my invention showing the pump itself in vertical cross-sectional view and the gear box in side elevational view.

FIG. 3 is a cross-sectional view in a vertical plane through a pipe joint of FIG. 1.

FIG. 4 is an enlarged cross-sectional view of the shaft seal of FIG. 2.

FIG. 5 is an enlarged cross-sectional view of the cover plate seal of FIG. 2.

FIG. 6 is an inside end elevational view of the pump end cover.

I have selected a food handling pump to exemplify my invention. Since the pump handles food, it is desirable that it be readily disassembled for cleaning. Obviously, the same requirements are frequently found in other types of equipment. Consequently, while the invention is specifically described in terms of a pump, it is desired to cover like equipment.

It is a feature of a pump or the like embodying my invention that parts requiring assembly and disassembly must have seals at all points where contamination or leakage may occur. This may include not only rotary seals but static seals of various types. As will appear from the drawings and the following description, the selected embodiment of the invention provides a rotary seal between complementary cylindrical shaft and bearing surfaces; a rotary seal wherein one of the sealing elements is disposed between complementary cylindrical surfaces and the other is disposed between complementary radial surfaces; a circular static seal between radial surfaces, as in the pipe joint; and an elliptical static seal between the pump body and its removable cover plate and interposed between the pump chamber and the row of dowels and bolts. In other words, the invention contemplates that all joints through which contamination might occur, or through which leakage might occur, will be provided with static or rotary seals employing sterile fluid under pressure to assure aseptic operation of the device.

In the drawings, FIG. 1 shows food handling pump having gear-connected vaned rotors of a type previously known, to which applicant's invention has been applied. Steam or another antiseptic medium is carried through pipe under control of valve 50 to pipes 11, 11', 12, 13, and 13', each of which communicates with a static aseptic seal conforming to my invention.

As shown in FIG. 3 flow pipes 11 and 11' communicate with pipe joints at the intake and outlet sides of the pump. Since the static aseptic seals at such joints may be identical, only one will be described, it being understood that the description is equally applicable to the other of said joints and to any static joint in which it is desired to provide the aseptic seal in accordance with my invention. The mating ends of the pipes to be connected are provided with radial flanges 16 and 17 having opposed conical cam surfaces 18 and 19 which are engaged by a clamp ring 20 having complementary conical surfaces 21 and 22, in a conventional manner. One of radial mating faces 23 and 24 of the respective flanges 16 and 17 is provided with concentric grooves 25 which receive O-rings 26 and 27. The grooves are shallower than the axial dimension of the O-rings so that upon application of ring 20 the O-rings are compressed between the radial faces of the joint. A land 15 is provided between grooves 25 which is of lesser height than the surface 23 to provide a closed channel completely surrounding the pipe joint between O-rings 26 and 27. Supply pipe 11 for a sterile fluid under pressure is secured to one of the flanges 16 or 17 to open into the channel formed by land 15, O-rings 26 and 27, and surface 24 of the other flange 16 or 17. An exhaust pipe 30 opens from said channel in an area well removed from pipe 11 and preferably spaced 180° around the flange therefrom. Pipe 30 may be provided with an exhaust valve 31, as shown, to control the pressure within the seal, but other methods such as a restriction in pipe 30 may be employed to accomplish the same result. Under some circumstances it may be desirable to connect the exhaust pipes to a circulating pump having its outlet connected to the supply pipe in order to re-use the sealing medium. Likewise, it may be desirable in some instances to re-circulate the steam in a conventional manner which may include a condenser and boiler, not shown.

FIGS. 5 and 6 show an enlarged view of the seal at the end of the pump body 32, which is shown in the broken away portion of FIG. 2, and which is similar to the seal just described in connection with pipe flanges 16 and 17.

Pump housing 32 is provided with a flat end surface 33 and end plate 34 of the housing is provided with a flat surface 35 complementary to surface 32 and extending entirely around the periphery of the pump. End cover 34 is located with respect to pump housing 32 by means of pins 36 which are spaced about the periphery of the housing as shown in FIG. 2 and is secured to the housing by means of studs 37 and wing nuts 38 shown in FIG. 1. End plate 34 (or pump body 32) is provided with grooves 40 and 41 extending concentrically to the periphery of the pump housing and end plate in a closed loop within the line of positioning pins 36 and studs 37. A land 42 is provided between grooves 40 and 41 which is recessed below surface 35. O-rings 43 and 44 are contained within grooves 40 and 41 to cooperate with surface 33 and land 42 to form a channel through which the sealing medium may circulate. As in the case of the seal on pipe flanges 16 and 17, the O-rings are elastomeric and are larger than the grooves 40 and 41 which they occupy so that when wing nuts 38 are tightened on studs 37 they provide a static seal with surface 33. Pipe 12 is secured to end plate 34 by pipe threads 45 which secure pipe 12 to channel 46 which extends through the end plate to the land 42, between O-ring grooves 40 and 41, to supply the sealing medium such as steam to the channel formed therebetween. An outlet pipe 47 connects with a channel 48 which is spaced 180° from channel 46 to serve as an exhaust outlet for the sealing medium, and a control valve 31 may be provided as above described to control the pressure within the seal where the steam is exhausted to the air. In the alternative, recirculating means may be employed or a simple restriction may be used to control the exhaust of the sealing medium. Even if recirculating means is employed it may be desirable in some instances to employ valves 31 along with supply valve 50 to control the pressures within the system.

The remaining two seals are similar to those just described except that they seal rotating parts and accordingly are cylindrical rather than disposed on a radial surface. Since the two shafts seals are identical, only one will be described. Pump shaft 60 is secured by a nut 61 and by splines 62 to rotor 63, which is provided with a pair of lobes which comprise one side of the pump. A complementary unit 63 is mounted on the lower pump shaft 64 by means of nut 65 or other conventional means to complete the pump unit. The shafts are driven in counter-rotation to provide the conventional pump action. This is accomplished by the gears shown in broken lines in FIG. 2, and the entire assembly is supported by bearings also shown in broken lines in FIG. 2. These gears and bearings must be lubricated, and accordingly are a possible source of contamination for the food product which is pumped by means of complementary rotors 63. It is also desirable to prevent contamination of the lubricant by the food product being pumped.

The seal between the pump section and the lubricated section containing the gear and the bearings is accomplished by a multiple seal similar to that just described. A pair of channels 66 contain O-rings 67 and 68 with a land 69 of lesser diameter than shaft 60 between O-ring 67 and 68 to form a channel for the sterile fluid between the shaft 60 and ring 70.

Ring 70 is provided with a cyindrical inner surface 71 which is complementary to outer surface 72 of shaft 60. A bore 73 through ring 70 provides steam to the channel defined by land 69, O-ring 67 and 68 and inner surface 71 of ring 70. A similar channel 74 spaced 180° therefrom takes the exhaust steam from said channel.

The sterile fluid is supplied by pipe 130 which is an extension of supply pipe 13 (shown in FIG. 1) within the housing 32, and connects with channel 75 in housing 32 which extends to an annular space 76 bounded by ring 70, O-ring 77, elastomeric seal 78, O-rings 79 and 80 and metallic rings 81 and 82. Thus annular channel 76 provides a seal for the space between rotor hub 63 and housing 32. The channel defined by land 69 between O-rings 67 and 68 serves as a parallel route for the fluid which passes from channel 76 through bore 73 and seals the space between rotor 63 and shaft 60, and further seals off any leakage which occurs between rotor 63 and ring 81. It will be seen that as in the case of the seal for the pipe joint and the seal for the cover of the pump housing, a seal has been provided which extends between elastomeric rings in a closed loop around the area to be sealed, and that within the space between said closed loops a sealing medium under positive pressure is circulated.

Exhaust channel 83 connects with exhaust conduit 140 which is an extension within the housing of exhaust conduit 14 (shown in FIG. 1). Conduit 14, like exhaust conduits 14', 30, 30' and 47 is provided with a valve 31 or other means to control the pressure of the sealing medium within conduit 76 and the channel which overlies land 69. Since these sealing channels are served by a common supply pipe 13 (or 13') and 130 and a common exhaust duct 14 (or 14') and 140, they form parallel circuits for the circulation of the steam or other sealing medium.

It will be seen that applicant has provided a simple and effective means for sealing joints against leakage either into the joint or out from the joint, and has further provided a simple and effective means for sterilizing the area to be sealed. While the specific device which has been described is a pump which is designed to handle food, applicant's seal may be useful in many other environments where positive protection against leaks or contamination is desired.

I claim:
1. An aseptic seal comprising a pair of parts to be sealed to each other, said parts having complementary surfaces, one of said complementary surfaces being provided with a pair of endless grooves extending circuitously in mutually spaced relation, a land between said grooves spaced from said complementary surface, a resiliently yieldable sealing ring in each said groove, means providing an inlet passage through one of said members to the space between said grooves to feed a sealing medium into said space, and means providing an exhaust passage for discharge of said medium and opening from the space between said sealing rings at a point remote from said inlet passage, and means for effecting the flow of a sterile sealing fluid into said inlet passage to provide a pressure seal between said sealing rings.

2. The device of claim 1 further comprising a constriction in said exhaust passage whereby to maintain said medium under positive pressure within said seal.

3. The device of claim 2 in which said medium is live steam.

4. The device of claim 2 in which said medium is an antiseptic solution.

5. In a food-handling pump, an aseptic seal comprising a pair of surfaces to be sealed, exposed in one area to a source of contamination and in another area to food requiring to be sealed from said source, a continuous channel in one said surface extending between said areas, said channel being bonded by at least a pair of concentric elastically yieldable seals extending between said complementary surfaces, first passage means for injecting a sterilizing medium at a positive pressure into said channel, and second passage means for exhausting said medium from said channel at a point remote from said first passage means, whereby the entire channel is filled with said medium at positive pressure.

6. The device of claim 5 in which said seal comprises two separate parallel channels, said channels being separated by an elastomeric element which defines one of said channels.

7. The device of claim 5 in which said surfaces to be sealed are cylindrical, one of said surfaces comprising a bore and the other of said surfaces comprising a shaft in said bore, said channel being provided about the circumference of said shaft.

8. The device of claim 5 in which said surfaces to be sealed are annular radial surfaces.

9. The device of claim 8 in which said annular radial surfaces form parts of a joint for attaching an extension to a pipe.

10. The device of claim 5 in which said surfaces to be sealed comprise flat planes, said channel extending approximately concentrically to the margins of said planes.

11. The device of claim 10 in which said flat planes comprise the body and the end plate of a pump designed for handling foods, whereby said seals prevent contamination of said foods.

12. The device of claim 7 in which said channel extends about the shaft of a gear pump designed for handling foods, said gear pump having a pump chamber and a lubricant-filled chamber, said channel being between said chambers whereby to separate the pump chamber from the lubricant-filled chamber to prevent contamination of said food and said lubricant.

13. A pump or the like for handling material required to be protected against contamination and comprising the combination with a chamber for such material, means within the chamber for acting on the material, a removable cover for the chamber, means providing inlet and outlet passages respectively leading to and from the chamber for the said material, motion-transmitting means extending into said chamber for actuating therein the said means for acting on material in said chamber, and means for completely protecting such material from contamination and comprising seals between the motion-transmitting means and the chamber and between the removable cover and the chamber, and between the chamber and the inlet and outlet passages, each of said seals comprising a pair of substantially continuous and mutually spaced elastically yieldable seal elements, means providing seats resisting the separation of said elements, and means for introducing a sterile fluid between the elements of each such pair under pressure exceeding the pressure of material in said chamber and also exceeding external pressure exerted toward said chamber, whereby said fluid resists contamination of such material from an external source and also resists escape of material from said chamber and also resists to-and-fro movement of material past said seals in response to variable differential pressures between said chamber and the exterior thereof.

14. A device according to claim 13 in which the said fluid comprises steam at sterilizing temperatures.

15. A device according to claim 13 in which said fluid comprises an antiseptic medium.

References Cited by the Examiner

UNITED STATES PATENTS

| 2,662,785 | 12/53 | Fawick. | |
| 2,760,791 | 8/56 | Neubauer et al. | 285—96 |
| 2,777,395 | 1/57 | Disbrow | 277—72 X |
| 3,036,846 | 5/62 | Peras | 277—177 X |

LAURENCE V. EFNER, *Primary Examiner.*

WALTER A. SCHEEL, *Examiner.*

UNITED STATES PATENT OFFICE
CERTIFICATE OF CORRECTION

Patent No. 3,191,545 June 29, 1965

Gilbert R. Funk

It is hereby certified that error appears in the above numbered patent requiring correction and that the said Letters Patent should read as corrected, below.

Column 2, line 7, after "pipe" insert -- 10 --.

Signed and sealed this 30th day of November 1965.

(SEAL)
Attest:

ERNEST W. SWIDER
Attesting Officer

EDWARD J. BRENNER
Commissioner of Patents